Figure 1:
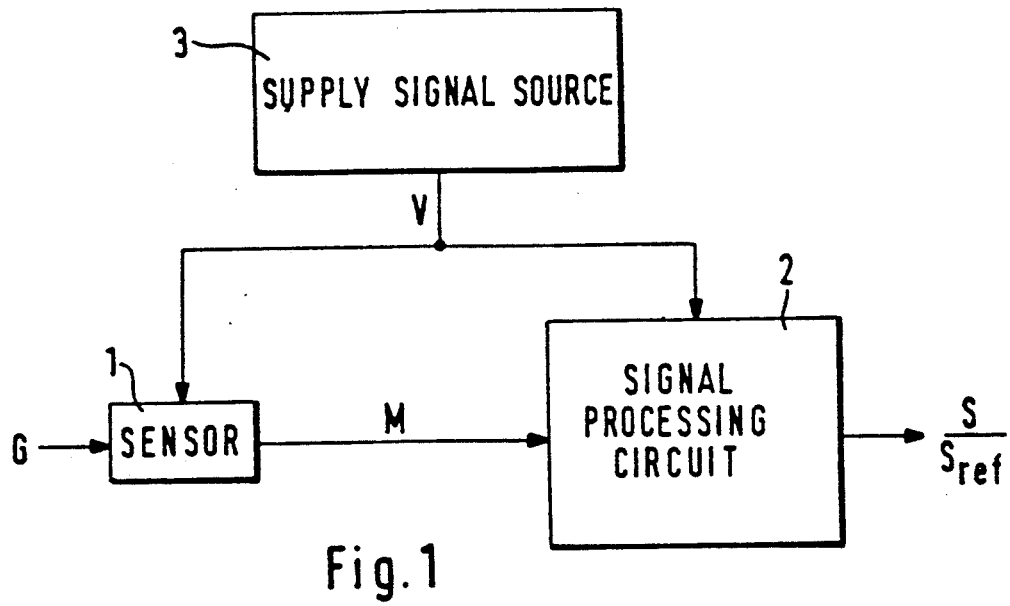

United States Patent [19]
Schneider et al.

[11] Patent Number: 5,210,501
[45] Date of Patent: May 11, 1993

[54] APPARATUS FOR PROCESSING SENSOR SIGNALS HAVING SWITCH-CAPACITOR STRUCTURES

[76] Inventors: Georg Schneider, Talstrasse 55, D-7860 Schopfheim-Langenau; Richard Wagner, Hans-Thoma-Strasse 9, D-7864 Maulburg, both of Fed. Rep. of Germany

[21] Appl. No.: 616,339

[22] Filed: Nov. 21, 1990

[30] Foreign Application Priority Data

Dec. 7, 1989 [DE] Fed. Rep. of Germany ....... 3940537

[51] Int. Cl.$^5$ .................... G01R 27/02; G01L 1/22
[52] U.S. Cl. .................... 324/720; 324/607; 324/678; 324/704; 73/862.628
[58] Field of Search .............. 324/704, 711, 607, 608, 324/678, 98, 720; 73/862.67, 796

[56] References Cited

U.S. PATENT DOCUMENTS

| | | | |
|---|---|---|---|
| 4,366,874 | 1/1983 | Pidoux et al. | 340/347 NT |
| 4,814,692 | 3/1989 | Baumann | 324/704 |
| 4,816,745 | 3/1989 | Schneider | 324/704 |
| 4,878,012 | 10/1989 | Schule et al. | 324/678 |

FOREIGN PATENT DOCUMENTS

| | | |
|---|---|---|
| 0007288 | 1/1980 | European Pat. Off. |
| 0105120 | 4/1984 | European Pat. Off. |
| 0216288 | 4/1987 | European Pat. Off. |
| 3633791 | 4/1988 | Fed. Rep. of Germany. |

OTHER PUBLICATIONS

"A Switched-Capacitor Charge-Balancing Analog-to-Digital Converter and Its Application to Capacitance Measurement", IEEE Transactions on Instrumentation and Measurement, vol. IM-36, No. 4, pp. 873-878, Dec. 1987, Matsumoto et al.
"Precision integrator resets as it samples", Electronics, vol. 45, pp. 78-79, Aug. 1972, Knowlton.

Primary Examiner—Gerard R. Strecker
Assistant Examiner—Diep Do
Attorney, Agent, or Firm—Barnes & Thornburg

[57] ABSTRACT

The arrangement serves to process sensor signals furnished by a sensor which when fed with a supply signal in response to the action of a physical measured quantity. The sensor generates a measuring effect representing the dependence of an electrical characteristic quantity on the physical measured quantity. The arrangement also includes a signal processing circuit which operates by the principle of quantized charge transport by means of switch-capacitor structures. The signal processing circuit establishes a charge balance by opposite integration of measuring charge packets dependent on the measuring effect and compensation charge packets independent of the measuring effect and furnishes an analog output signal corresponding to the integration result. The analog output signal also provides a feedback input to the sensor. By this feedback the analog output signal is regulated so that it is proportional to the measurement result.

7 Claims, 4 Drawing Sheets

APPARATUS FOR PROCESSING SENSOR SIGNALS HAVING SWITCH-CAPACITOR STRUCTURES

The invention consists in an arrangement for processing sensor signals which are furnished by a resistance sensor which on feeding with a supply signal in response to the action of a physical measured quantity generates a measuring effect representing the dependence of the electrical resistance on the physical measured quantity, comprising a signal processing circuit which operates by the principle of the principle of quantized charge transport by means of switch-capacitor structures and which establishes a charge balance by opposite integration of measuring charge packets dependent on the measuring effect and compensation charge packets independent of the measuring effect and which furnishes an analog output signal corresponding to the integration result and with influencing the supply of the resistance sensor by feedback of a feedback signal in fixed relationship to the analog output signal to obtain the charge balance.

The U.S. Pat. No. 4,816,745 describes an arrangement of this type in which the resistance sensor is a half-bridge with oppositely variable resistors. In this arrangement the measuring charge packets dependent on the measuring effect are integrated until the integrated charge exceeds a predetermined threshold value, whereupon by integration of a compensation charge packet of opposite sign independent of the measuring effect the initial state is again established. In this manner a charge balance arises in the integrator at which the ratio of the number of the compensation charge packets integrated in a predetermined time interval to the number of the measuring charge packets integrated in the same time interval indicates the measured value. The measurement result is thus present in digital form and consequently the signal processing circuit of the prededescribed arrangement always furnishes a digital output signal.

The problem underlying the invention is the provision of an arrangement of the type set forth at the beginning in which the signal processing circuit furnishes directly an analog output signal indicating the measured value.

Since in the arrangement according to the invention the supply of the sensor via the feedback signal depends on the output signal, the magnitude of the integrated charge packets also depends on the output signal. By the feedback the magnitude of the charge packets is influenced so that the charge balance is obtained. Whereas the ratio of the number of the compensation charge packets to the number of the measuring charge packets remains constant, the analog signal corresponding to the integration result is directly proportional to the measuring effect. The signal processing circuit thus furnishes the measurement result in the form of an analog output signal.

Advantageous embodiments and further developments of the invention are characterized in the subsidiary claims.

Figure 2:
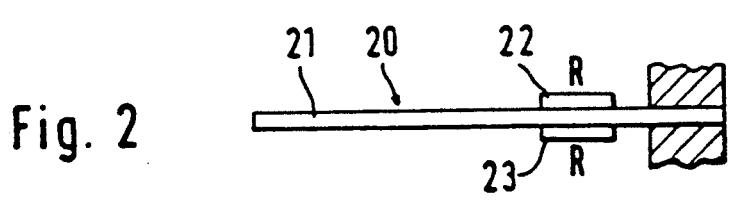
Figure 3:
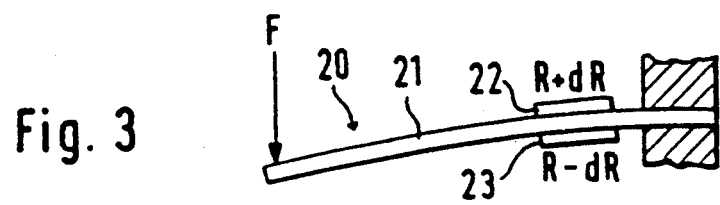
Figure 4:
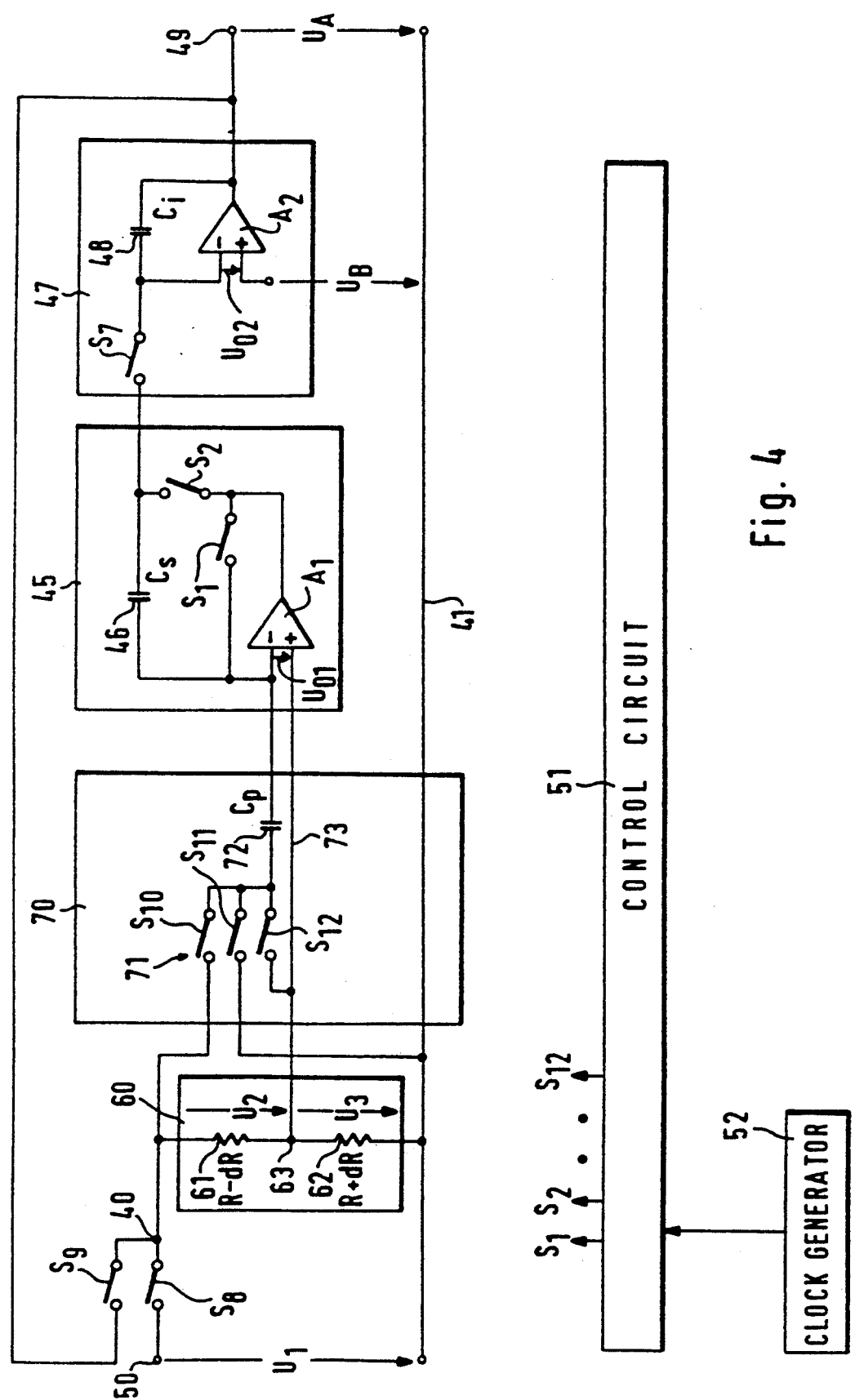
Figure 5:
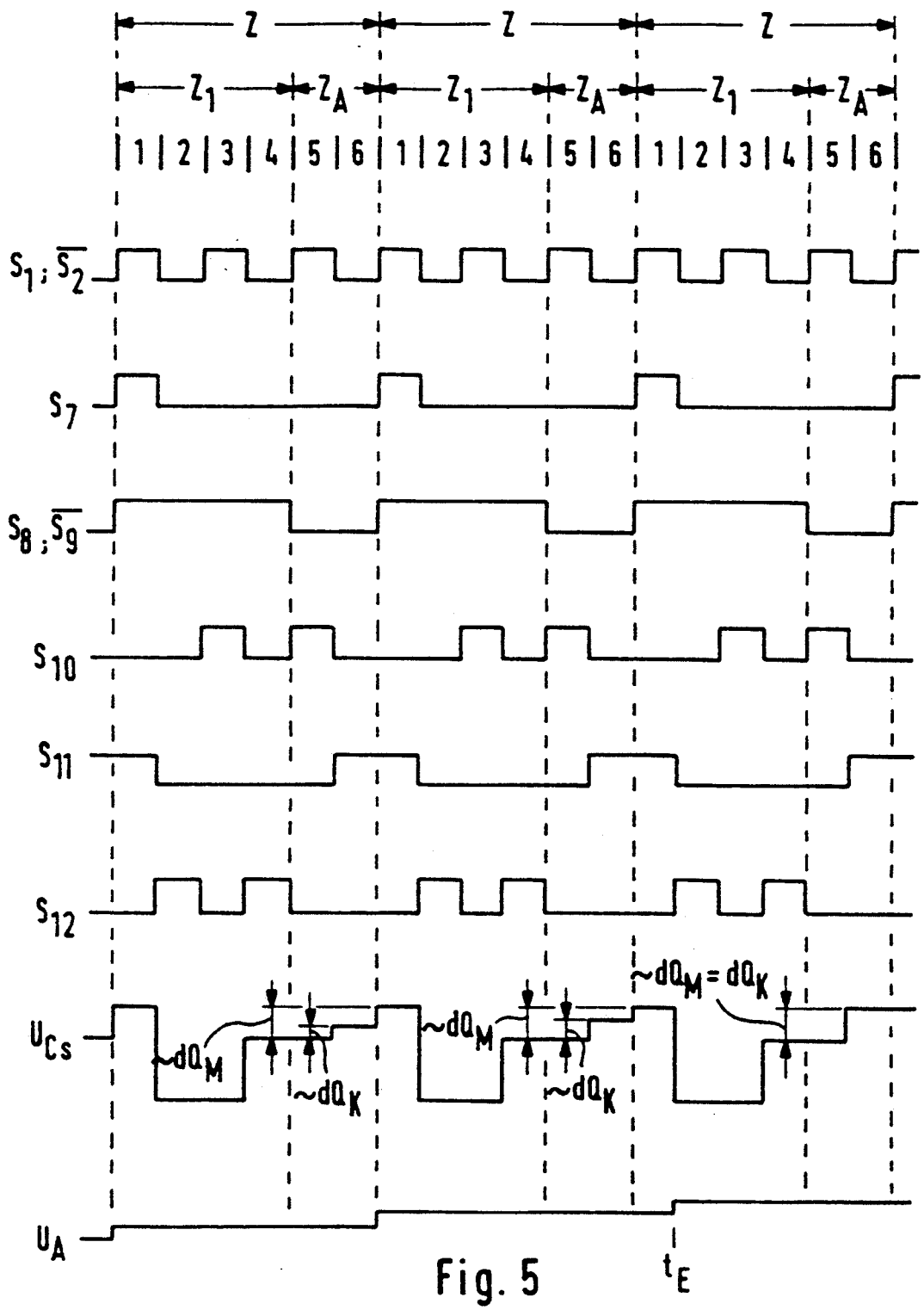
Figure 6:
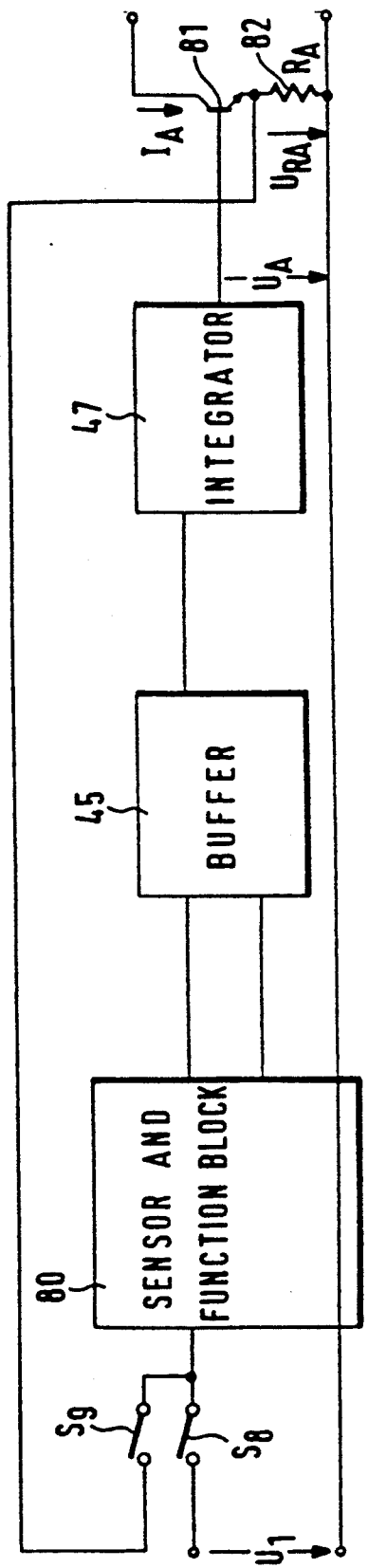

Further features and advantages of the invention will be apparent from the following description of examples of embodiment which are illustrated in the drawings, wherein:

FIG. 1 shows a fundamental scheme for explaining the problem underlying the invention, FIG. 2 is a schematic representation of a resistance sensor with strain gauges in the unloaded state, FIG. 3 shows the resistance sensor of FIG. 2 in the loaded state, FIG. 4 shows the circuit diagram of a signal processing circuit operating with quantized charge transport and charge balancing, FIG. 5 shows time diagrams which occur in the signal processing circuit of FIG. 4, and FIG. 6 shows a schematic representation of a modified embodiment of the signal processing circuit of FIG. 4 for furnishing an analog output current.

To improve understanding, in FIG. 1 the principle of processing sensor signals on which the invention is based is shown. FIG. 1 shows a resistance sensor 1 with the aid of which a physical quantity G, e.g. a force, is to be measured, and a signal processing circuit 2 connected to the sensor 1. Its resistance is the electrical characteristic quantity which is variable in dependence upon the physical quantity to be measured. A supply signal source 3 furnishes to the sensor 1 a supply signal V which makes it possible to convert the change of the electrical characteristic quantity to an electrical sensor signal which is supplied to the signal processing circuit 2 and expresses the measuring effect M representing the relationship between the physical quantity G to be measured and the electrical characteristic quantity. The signal processing circuit 2 converts the sensor signal to an output signal S of the desired form which is preferably related to a reference signal $S_{ref}$. Depending on the construction of the signal processing circuit 2, the output signal S may for example be an analog signal, a digital signal or a frequency.

If the physical quantity G to be measured is a force, a force sensor as illustrated in FIGS. 2 and 3 may be used. The force sensor 20 comprises a resilient beam 21 which is fixedly clamped at one end and deformable by a force F acting on its free end. On two opposite sides of the beam 21 two strain gauges 22 and 23 are secured in such a manner that they deform in opposite senses on deformation of the beam 21. For example, with the deformation of the beam 21 illustrated in FIG. 3 the strain gauge 22 is extended and the strain gauge 23 shortened. As is known, in strain gauges the ohmic resistance depends on the change in length. In the undeformed state (FIG. 2) the two strain gauges 22 and 23 have the same ohmic resistance R. With the opposite deformation illustrated in FIG. 3 the strain gauge 22 has the ohmic resistance R+dR and the strain gauge 23 the ohmic resistance R−dR. The force sensor 20 of FIGS. 3 and 4 is thus an example of a sensor in which the electrical characteristic quantity depending on the physical quantity to be measured is a resistance. The measuring effect which is employed to measure the force P is preferably the resistance ratio dR/R. To obtain a sensor signal proportional to this resistance ratio the two oppositely deformable strain gauges 22, 23 are connected electrically so as to form a resistance half-bridge. Also two pairs of oppositely deformable strain gauges may be present which are connected together to form a resistance full bridge.

FIG. 4 shows an example of embodiment of the signal processing circuit 2 of FIG. 1 for the signal processing of the sensor signal furnished by a resistance half-bridge 60 and FIG. 5 shows the time profile of the associated switch control signals and voltages. The resistance half-bridge 60 contains two resistors 61,62 which are connected in series between a terminal 40 and a reference conductor 41 and the connection point of which forms a tap 63.

The resistance values of the resistors 61 and 62 differ from an identical basic value R by the same amounts dR, which are however of opposite sign. As example, it is indicated that the resistor 61 has the value R−dR and the resistor 62 the value R+dR. The resistor half-bridge 60 may therefore be formed for example by the force sensor 20 of FIGS. 2 and 3, the resistors 61 and 62 representing the resistance values of the strain gauges 23 and 22 respectively. R is the resistance value of the undeformed strain gauge and dR is the resistance change effected by the deformation of the strain gauge. The resistance ratio dR/R represents the measuring effect M of interest which in the case of the force sensor 20 of FIGS. 2 and 3 gives the relationship between the force F to be measured and the resistance change of the strain gauges.

For better understanding the functional processes the sensor 60 in FIG. 4 is inserted between two circuit blocks of the signal processing circuit but in reality it will be spatially separate from the signal processing circuit, which may be configured as integrated circuit, and connected to the latter via shielded lines. The signal processing circuit operates by the principle of charge balancing with switch-capacitor combinations. Whereas however such signal processing circuits usually convert the analog sensor signal to a digital output signal representing the measured value, the signal processing circuit of FIG. 4 is constructed in a particular manner so that it furnishes an analog output signal.

The sensor 60 is connected on the one hand to a function block 70 and on the other hand to a buffer 45. The function block 70 contains a switch group 71, a capacitor 72 with capacitance $C_p$ and a continuous connecting conductor 73 which connects the tap 63 of the resistance half-bridge 60 permanently to the non-inverting input of an operational amplifier $A_1$ in the buffer 45. The switch group 71 contains three switches $S_{10}$, $S_{11}$ and $S_{12}$. The one electrode of the capacitor 72 is permanently connected to the inverting input of the operational amplifier $A_1$. The other electrode of the capacitor 72 is connected by the switch $S_{10}$ to the input terminal 40, by the switch $S_{11}$ to the reference conductor 41 and by the switch $S_{12}$ to the connecting conductor 73.

The resistor half-bridge 60 forms a voltage divider at which when the switch $S_8$ is closed a supply voltage $U_1$ is present and when the switch $S_9$ is closed the output voltage $U_A$. The voltage present between the terminal 40 and the tap 63 at the resistor 61 is denoted by $U_2$ and the voltage present between the tap 63 and the reference conductor 41 at the resistor 62 is denoted by $U_3$.

The buffer 45 contains the operational amplifier $A_1$, a storage capacitor 46 of a capacitance $C_s$ and two switches $S_1$, $S_2$. When the switch $S_1$ is closed it connects the output of the amplifier $A_1$ to the inverting input thereof. When the switch $S_2$ is closed it connects the output of the operational amplifier $A_1$ to the one electrode of the storage capacitor 46, the other electrode of which is connected to the inverting input of the operational amplifier $A_1$ so that the storage capacitor 46 then lies in the feedback circuit of the operational amplifier $A_1$. The non-inverting input of the amplifier $A_1$ lies at the tap 63. The potential at the inverting input differs from that of the non-inverting input by the offset voltage $U_{01}$ of the operational amplifier $A_1$.

The buffer 45 is followed by an integrator 47. The integrator 47 includes an operational amplifier $A_2$, an integration capacitor 48 of capacitance $C_1$ lying in the feedback circuit of the operational amplifier $A_2$ and a switch $S_7$. When the switch $S_7$ is closed it connects the inverting input of the operational amplifier $A_2$ to the storage capacitor 46 in the buffer 45. The noninverting input of the operational amplifier $A_2$ is connected to a fixed potential which differs by a voltage $U_B$ from the potential of the reference conductor 41. The potential at its inverting input differs from the fixed potential of the noninverting input by the offset voltage $U_{02}$ of the operational amplifier $A_2$. The output of the operational amplifier $A_2$ is connected to the output terminal 49 of the signal processing circuit. Between the output terminal 49 and the reference conductor 41 the output voltage $U_A$ appears.

When it is closed, a switch $S_8$ connects the terminal 40 to an input terminal 50 and a switch $S_9$, when it is closed, connects the terminal 40 to the output terminal 49. In operation of the circuit between the output terminal 50 and the reference conductor 41 a supply voltage $U_1$ is applied which corresponds to the supply signal V of FIG. 1.

The switches $S_1$, $S_2$, and $S_7$ to $S_{12}$ are actuated by control signals which are furnished by a control circuit 51 which is synchronized by a clock signal fed by a clock generator 52. For simplification the clock signals are denoted by the same reference numerals S.. as the switches controlled by them.

Each switch S.. is open when the signal controlling it has a low signal value and is closed when the signal controlling it has a high signal value. The switches S.. are represented symbolically as mechanical switch contacts but in reality of course they are highspeed electronic switches, for example field-effect transistors.

The mode of operation of the signal processing circuit of FIG. 4 will now be explained with the aid of FIG. 5.

Apart of the already mentioned time profile of the control signals $S_1$ to $S_{12}$ the diagrams of FIG. 5 also show the time profile of the voltage $U_{Cs}$ at the storage capacitor 46 and the output voltage $U_A$ in the course of several consecutive cycles Z. Each cycle Z is divided into six phases denoted 1 to 6.

The switches $S_1$ and $S_2$ are controlled by a periodic square-wave signal in antiphase manner so that the switch $S_1$ is open when the switch $S_2$ is closed and vice-versa. The switches $S_1$ and $S_2$ assume their alternating states in each case for the duration of one of the phases 1 to 6. When the switch $S_1$ is closed and the switch $S_2$ is open, which is the case in each of the phases 1, 3 and 5 of each cycle Z, the capacitor lying in the input circuit of the operational amplifier $A_1$ can be applied by one of the switches $S_{10}$ to $S_{12}$ to one of the voltages $U_2$, $U_3$ or $U_{01}$ and correspondingly charged without thereby influencing the charge in the storage capacitor 46. The circuit is then in a conditioning phase for the conditioning of the capacitor 72. If on the other hand the switch $S_1$ is open and the switch $S_2$ is closed the buffer 45 is ready for the transfer of charge from the capacitor 72 to the storage capacitor 46.

The switches $S_8$ and $S_9$ are likewise controlled by a periodic square-wave signal in antiphase manner so that the switch $S_8$ is open when the switch $S_9$ is closed and vice-versa. During the phases 1 to 4 of each cycle Z the switch $S_8$ is closed and the switch $S_9$ is open. The phases 1 to 4 of each cycle Z thus form a subcycle $Z_1$ in which the voltage $U_1$ is applied to the resistor half-bridge 60. In contrast, in phases 5 and 6 the switch $S_9$ is closed and the switch $S_8$ open. The phases 5 and 6 thus form a subcycle $Z_A$ is applied to the resistor half-bridge 60.

In each subcycle $Z_1$ in which the voltage $U_1$ is applied to the resistor half-bridge 60 the voltage $U_1$ and $U_3$ have the following values:

$$U_{2(1-4)} = U_1 \cdot \frac{R - dR}{(R - dR) + (R + dR)} = U_1 \cdot \frac{R - dR}{2R} \quad (1)$$

$$U_{3(1-4)} = U_1 \cdot \frac{R + dR}{(R - dR) + (R + dR)} = U_1 \cdot \frac{R + dR}{2R} \quad (2)$$

In each subcycle $Z_A$ in which the voltage $U_A$ is applied to the resistor half-bridge 60 the voltages $U_2$ and $U_3$ have the values $$U_{2(5,6)} = U_A \cdot \frac{R - dR}{(R - dR) + (R + dR)} = U_A \cdot \frac{R - dR}{2R} \quad (3)$$

$$U_{3(5,6)} = U_A \cdot \frac{R + dR}{(R - dR) + (R + dR)} = U_A \cdot \frac{R + dR}{2R} \quad (3)$$

The signal processing circuit of FIG. 4 operates by the principle of charge balancing which takes place in the storage capacitor 46. The function block 70 furnishes discrete charge packets which are transferred to the storage capacitor 46. Said charge packets are generated in that the capacitor 72 is alternately charged and reverse charged by the different voltages $U_2$, $U_3$ and $U_{01}$ with the aid of the switches $S_{10}$, $S_{11}$, $S_{12}$. The charge packets stored in the storage capacitor 46 and summated are transferred by closing the switch $S_7$ to the integration capacitor 48. With the time profile of the various switch control signals illustrated in FIG. 8 the following time sequence results for the operation of the signal processing circuit of FIG. 4:

Phase 1

At the start of phase 1 of each cycle Z the charge applied in the preceding cycle is still present on the storage capacitor 46. For the duration of the phase 1 the switch $S_1$ is closed and the switch $S_2$ open so that the storage capacitor 46 is separated from the output of the operational amplifier $A_1$. The switch $S_7$ is closed for the duration of the phase 1 so that a charge transfer takes place from the storage capacitor 46 to the integration capacitor 48. The storage capacitor 46 is thereby discharged to the residual charge $$Q_{Cs(R)} = (U_{02} - U_{01}) \cdot C_s \quad (5)$$

the reverse charge amount flowing to the integration capacitor 48. Furthermore, for the duration of the phase 1 the circuit is in the conditioning phase for the capacitor 72 because the switch $S_1$ is closed and the switch $S_2$ is open. Since at the same time the switch $S_{11}$ is closed, the capacitor 72 is connected to the reference conductor 41 so that it is charged to the charge $$Q_{Cp(1)} = (U_{01} - U_{3(1-4)}) \cdot C_p \quad (6)$$

without the charge of the storage capacitor 46 being influenced by this charging operation.

Phase 2

In phase 2 of each cycle Z the switch $S_1$ is open and the switch $S_2$ closed so that the buffer 45 is ready for the transfer of charge to the storage capacitor 46. At the same time the switch $S_{12}$ is closed so that the capacitor 72 is connected via the connecting conductor 73 to the noninverting input of the operational amplifier $A_1$. As a result, at the capacitor 72 only the offset voltage $U_{01}$ is present by which it is reverse charged to the charge $$Q_{Cp(2)} = U_{01} \cdot C_p \quad (7)$$

The reverse charge amount $$dQ_{Cp(1,2)} = Q_{Cp(2)} - Q_{Cp(1)} = -U_{3(1-4)} \cdot C_p \quad (8)$$

flows to the storage capacitor 46 and causes a negative change of the voltage $U_{Cs}$ as is apparent from the associated diagram of FIG. 5.

Phase 3

In phase 3 the switch $S_1$ is again closed and the switch $S_2$ open so that the circuit is in the conditioning phase for the capacitor 72. However, the switch $S_7$ remains open so that no charge transfer takes place from the storage capacitor 46 to the integration capacitor 48 and the storage capacitor retains its charge. Furthermore, the switch $S_{10}$ is now closed so that the capacitor 72 is connected to the terminal 40 and is thus charged to the charge $$Q_{Cp(3)} = (U_{01} - U_{2(1-4)}) \cdot C_p \quad (9)$$

Phase 4

In phase 4 the switch $S_1$ is open and the switch $S_2$ closed so that the buffer 45 is ready for the transfer of charge. At the same time the switch $S_{12}$ is again closed so that the capacitor 72 is connected via the connecting conductor 73 to the noninverting input of the operational amplifier $A_1$ and by the offset voltage $U_{01}$ is reverse charged to the charge $$Q_{Cp(4)} = U_{01} \cdot C_p \quad (10)$$

The reverse charge amount $$dQ_{Cp(3,4)} = Q_{Cp(4)} - Q_{Cp(3)} = U_{2(1-4)} \cdot C_p \quad (11)$$

flows to the storage capacitor 46 and causes a positive change of the voltage $U_{Cs}$ as is apparent from the associated diagram of FIG. 5. This positive voltage change is however smaller than the negative voltage change caused in the phase 2 because the voltage $U_{2(1-4)}$ is less than the voltage $U_{3(1-4)}$.

Thus, in the phases 1 to 4 altogether a measuring charge packet $$dQ_M = dQ_{Cp(1,2)} + dQ_{Cp(3,4)} = U_{2(1-4)} \cdot C_p - U_{3(1-4)} \cdot C_p \quad (12)$$

has been transferred to the storage capacitor 46. If the values from the equations (1) and (2) are inserted for $U_{2(1-4)}$ and $U_{3(1-4)}$, this gives $$dQ_M = U_1 \cdot C_p(R - dR)/2R - U_1 \cdot C_p(R + dR)/2R$$
$$= -U_1 \cdot C_p \cdot dR/R \quad (13)$$

The difference between the changes of the voltage $U_{Cs}$ caused in phases 2 and 4 is proportional to this measuring charge packet $dQ_M$, as is indicated in the associated diagram of FIG. 5.

Phase 5

Phase 5 is again a conditioning phase for the capacitor 72. Since the switch $S_{10}$ is closed, the capacitor is charged to the charge $$Q_{Cp(5)} = (U_{01} - U_{2(5,6)}) \cdot C_p \qquad (14)$$

Phase 6

In phase 6 the switch $S_{11}$ is closed so that the capacitor 72 is connected to the reference conductor 41 and is reverse charged to the charge $$Q_{Cp(6)} = (U_{01} - U_{3(5,6)}) \cdot C_p \qquad (15)$$

The reverse charge amount is transferred as compensation charge packet $$dQ_K = Q_{Cp(6)} - Q_{Cp(5)} = U_{2(5,6)} \cdot C_p + U_{3(5,6)} \cdot C_p \qquad (16)$$

to the storage capacitor 46. If the values from the equations (3) and (4) are inserted for $U_{2(5,6)}$ and $U_{3(5,6)}$, this gives, $$dQ_K = U_A \cdot C_p(R - dR)/2R + U_A \cdot C_p(R + dR)/2R = U_A \cdot C_p \qquad (17)$$

The compensation charge packet $dQ_K$ causes a positive change of the voltage $U_{Cs}$ proportional thereto as is indicated in the corresponding diagram of FIG. 5.

Each cycle Z may consist of n subcycles $Z_1$ and k subcycles $Z_A$; FIG. 5 shows the relationships for the special case $n = k = 1$. In the general case in each cycle Z the charge $$Q_{Cs(Z)} = Q_{Cs(R)} + n \cdot dQ_M + k \cdot dQ_K \qquad (18)$$

has collected on the storage capacitor 46. At the start of the following cycle Z the storage capacitor 46 is again discharged to the residual charge $Q_{Cs(R)}$. The differential charge $$dQ = n \cdot dQ_M + k \cdot dQ_K \qquad (19)$$

is transferred to the integration capacitor 48, thereby regulating the output voltage $U_A$. The circuit thus operates as a closed loop which tends to bring the output voltage $U_A$ to a value at which the sum of the k compensation charge packets $dQ_K$ is equal to the sum of the n measuring charge packets $dQ_M$. When this charge is reached, charge balance exists in the storage capacitor 46:

$$n \cdot dQ_M + k \cdot dQ_K = 0 \qquad (20)$$

By inserting the values for $dQ_M$ and $dQ_K$ from the equations (13) and (17), this gives the transfer function of the circuit:

$$\frac{U_A}{U_1} = \frac{n}{k} \cdot \frac{dR}{R} \qquad (21)$$

The ratio of the analog output voltage $U_A$ to the supply voltage $U_1$ therefore indicates in the steady state the desired resistance ratio directly. In FIG. 5 it is assumed that the steady state has arisen at the instant $t_E$ at the end of the second cycle Z illustrated. From this instant on the voltage $U_A$ no longer changes as long as the resistances 61 and 62 retain their values. On a change of the resistance ratio $dR/R$ the output voltage $U_A$ changes to another value with a time constant defined by the capacitance $C_1$ of the integrated capacitor 48.

The capacitance value of the capacitor 72 does not enter the transfer function but it does govern the magnitude of the charge packets and thus the dimensioning of the capacitors 46 and 48. Likewise, the capacitance values of the capacitors 46 and 48, the offset voltages of the operational amplifiers, the supply voltage of the circuit and the frequency with which the control circuit is clocked do not enter the final result.

The value of the voltage $U_1$ is limited only by the working range of the circuit. If the current supply voltage of the circuit is chosen as supply voltage $U_1$, then in accordance with equation (21) an output signal is obtained which is proportional to the current supply voltage.

If a fixed reference voltage $U_{ref}$ is chosen as supply voltage $U_1$ then in accordance with equation (21) an absolute output signal is obtained.

FIG. 6 shows a modification of the circuit of FIG. 4 which furnishes an analog output current $I_A$ instead of an analog output voltage $U_A$. In FIG. 6 the buffer 45 and the integrator 47 of FIG. 4 are each represented by a circuit block 80 consisting of the resistor half-bridge 60 and the function block 70 of FIG. 4.

In FIG. 6 the output of the integrator 47 is connected to the base of an n-p-n transistor 81 which is connected as emitter follower with a resistor 82 of value $R_A$ lying in the emitter circuit. The feedback leading to the switch $S_9$ is connected to the emitter of the transistor 81. The output voltage $U_A$ of the integrator 47 causes the output current $I_A$ to flow through the collector-emitter circuit of the transistor 81. Thus, with this circuit the voltage $$U_{RA} = R_A \cdot I_A \qquad (22)$$

is fed back to the input. Thus, for the compensation charge packet $dQ_K$ instead of the equation (17):

$$dQ_K = U_{RA} C_p \qquad (23)$$

Accordingly, instead of equation (20) the transfer function is:

$$I_A/U_1 = [n/(kR_A)](dR/R) \qquad (24)$$

The circuit of FIG. 6 is particularly suitable for measuring arrangements in which the measured value signal is transmitted in the form of a direct current via a single two-conductor line, said current being variable for example between 4 mA and 20 mA and also comprises the supply current for the sensor and the signal processing circuit.

We claim:

1. Arrangement for processing sensor signals being furnished by a resistance sensor generating a measuring effect signal representing the dependence of the electrical resistance of said sensor on a physical quantity to be measured in response to the action of said physical quantity, said resistance sensor being fed with a supply signal, the arrangement comprising a signal processing circuit having an input for receiving said measuring effect signal and an output, said signal processing circuit including switch-capacitor structures operating by the principle of quantized charge transport and establishing a charge balance by opposite integration of measuring charge packets dependent on said measuring effect signal and compensation charge packets independent of said measuring effect signal, and means the signal processing circuit furnishing at its output an analog output signal corresponding to the integration result, and said feeding of said resistance sensor with said supply signal being influenced by a feedback signal coupled from the output of said processing circuit to said resistance sensor which is in fixed relationship to said analog output signal to obtain said charge balance.

2. Arrangement according to claim 1 in which said feedback signal is used in periodic alternation with said supply signal for feeding said resistance sensor.

3. Arrangement according to claim 2 in which said switch-capacitor structures are controlled in such a manner that they generate said measuring charge packets on supplying said sensor with said supply signal and said compensation charge packets on supplying said sensor with said feedback signal.

4. Arrangement according to claim 1 in which said supply signal is a voltage and said analog output signal is likewise a voltage which is used as said feedback signal.

5. Arrangement according to claim 1 in which said supply signal is a voltage, said analog output signal is a current and said feedback signal is a voltage proportional to said current.

6. Arrangement according to claim 4 in which said supply signal is a current supply voltage or a fixed reference voltage.

7. Arrangement according to claim 5 in which said supply signal is a current supply voltage or a fixed reference voltage.

* * * * *